(12) United States Patent
Martini et al.

(10) Patent No.: US 9,776,231 B2
(45) Date of Patent: Oct. 3, 2017

(54) PORTABLE, SELF-CONTAINED FIBER OPTIC CLEANING TOOL

(71) Applicant: Illinois Tool Works Inc., Glenview, IL (US)

(72) Inventors: Eric Martini, Smyrna, GA (US); Paul Blair, Jonesboro, GA (US); Russell Kroll, Atlanta, GA (US); Ben Bailey, Atlanta, GA (US); Robert Wilkey, Atlanta, GA (US); Adam Britton, Atlanta, GA (US)

(73) Assignee: ILLINOIS TOOL WORKS INC., Glenview, IL (US)

(*) Notice: Subject to any disclaimer, the term of this patent is extended or adjusted under 35 U.S.C. 154(b) by 42 days.

(21) Appl. No.: 14/977,034

(22) Filed: Dec. 21, 2015

(65) Prior Publication Data

US 2016/0199894 A1    Jul. 14, 2016

Related U.S. Application Data

(60) Provisional application No. 62/101,732, filed on Jan. 9, 2015.

(51) Int. Cl.
*B21B 45/02*  (2006.01)
*G02B 6/38*   (2006.01)

(52) U.S. Cl.
CPC ............ *B21B 45/02* (2013.01); *G02B 6/3866* (2013.01)

(58) Field of Classification Search
None
See application file for complete search history.

(56) References Cited

U.S. PATENT DOCUMENTS

| | | | |
|---|---|---|---|
| 6,393,651 B1 | 5/2002 | Forrest, Jr. et al. |
| 6,523,908 B2 | 2/2003 | Forrest, Jr. et al. |
| 6,795,998 B1 | 9/2004 | Kammerer et al. |
| 7,526,830 B2 | 5/2009 | Forrest et al. |
| 7,552,500 B2 | 6/2009 | Forrest, Jr. |
| 7,837,801 B2 | 11/2010 | Christopher et al. |
| 7,971,304 B2 | 7/2011 | Kida et al. |
| 8,336,149 B2 | 12/2012 | Blair et al. |
| 8,429,784 B2 | 4/2013 | Forrest, Jr. et al. |

(Continued)

FOREIGN PATENT DOCUMENTS

| | | |
|---|---|---|
| EP | 2400325 A1 | 12/2011 |
| EP | 2746829 A1 | 6/2014 |

(Continued)

OTHER PUBLICATIONS

International Search Report issued by the ISA/EP in connection with PCT/US2015/068140 on Mar. 23, 2016.

*Primary Examiner* — Michael Barr
*Assistant Examiner* — Cristi Tate-Sims
(74) *Attorney, Agent, or Firm* — Levenfeld Pearlstein, LLC

(57) ABSTRACT

A fiber optic component cleaning device includes a body, a feed spool mounted for rotation in the body, a take-up spool mounted for one-way rotation in the body and a central support assembly. A plunger is mounted for movement in the central support assembly and a drive is operably connected to the take-up spool and to the plunger. A cleaning material is wound onto and fed from the feed spool and to the take-up spool. A reservoir assembly is mountable to the body to apply a cleaning solution to the cleaning material.

19 Claims, 16 Drawing Sheets

(56) References Cited

U.S. PATENT DOCUMENTS

| | | |
|---|---|---|
| 2003/0098045 A1 | 5/2003 | Loder et al. |
| 2008/0000037 A1* | 1/2008 | Christopher .............. B08B 1/00 15/97.1 |
| 2008/0209656 A1 | 9/2008 | Kida |
| 2010/5028570 | 10/2015 | Forrest, Jr. |

FOREIGN PATENT DOCUMENTS

| | | | |
|---|---|---|---|
| JP | 2746829 A1 * | 6/2014 | ............. B08B 1/006 |
| WO | 2014141405 A1 | 9/2014 | |

* cited by examiner

PORTABLE, SELF-CONTAINED FIBER OPTIC CLEANING TOOL

CROSS-REFERENCE TO RELATED APPLICATION DATA

This application claims the benefit of and priority to Provisional U.S. Patent Application Ser. No. 62/101,732, filed Jan. 9, 2015, the entirety of which is incorporated herein by reference.

BACKGROUND

Communication systems and platforms are often combinations of copper, wireless and fiber optic media. Transmission rates and capacities have increased and are now measured in gigabytes and terabytes per second to a contemporary standard of ten gigabytes per second. Research continues to move transmission rates toward petabytes and beyond.

In order to achieve, maintain, and even surpass these transmission rates, transmission media and in particular fiber optic conductors must be fabricated and maintained to exacting standards and tolerances. This is particularly so in the fabrication, manufacture, installation, maintenance and testing of fiber optic component end faces. These end faces frequently become contaminated with dirt, dust, oil, grease, and other debris. Contamination, dry, fluidic and combinations thereof can have a significant impact on the quality (e.g., speed and integrity) of transmission across fiber optic networks. As such, cleaning the fiber optic connectors preserves the quality of these very high-speed transmissions. Various types of fiber optic connectors are known. Some of these connectors permit the joining of single optical fibers. Other types of connectors more efficiently permit the joining or connecting of multiple fibers in a single physical connector body. The various types of connectors as such have differing physical structures, connector configurations, components and the like.

Improper cleaning can result in the reflectance of the fiber optic transmission (signal), in which the signal is sent back along the transmission path. Improper cleaning can also leave a residue that, improperly characterized as non-removable, can create a stand-off between mated connection to results in signal loss.

Numerous devices are available for cleaning fiber optic end faces. For example, Forrest, U.S. Pat. Nos. 8,429,784, 8,336,149 and 7,552,500, which patents are commonly assigned with the present application and are incorporated herein in their entirety, disclose various devices for cleaning fiber optic connectors. These devices function well to clean many of the surfaces and areas of fiber optic connectors, however, due to their larger size may not be as effective for cleaning more difficult to access areas of the connectors.

Other devices, such as the swabs disclosed in Forrest, U.S. Pat. Nos. 7,526,830, 6,523,908 and 6,393,651, and Kammerer, U.S. Pat. No. 6,795,998, also function well as devices for cleaning fiber optic connectors. However, because these devices require manually moving the swab to remove contamination, they may not be usable to facilitate cleaning all areas of the connectors.

Fiber optic backplane cleaning can also be difficult due to workspace and access constraints which many of the known devices do not address. Size limitations and device handling also pose issues with for proper backplane cleaning using known devices.

Accordingly, there is a need for a fiber optic cleaning tool that can be used to effectively clean all areas of fiber optic connectors including end faces and components in backplane locations. Desirably, such a tool is portable, allowing it to be used in difficult to access locations. More desirably still such a tool is self-contained and provides the ability to be used in wet to dry cleaning operations.

SUMMARY

A fiber optic component cleaning device includes a body, a feed spool mounted for rotation in the body and a take-up spool mounted for one-way rotation in the body and a central support assembly. A plunger is mounted for movement in the central support assembly. In an embodiment, the plunger is mounted for reciprocating movement in the central support assembly.

A drive is operably connected to the take-up spool and to the plunger and a cleaning material is wound onto the feed and take-up spools. The cleaning material is fed from the feed spool to the take-up spool. In an embodiment, an end of the plunger defines a cleaning finger and the cleaning material traverses over an end of the cleaning finger. A tape retainer can be positioned on the plunger to maintain the tape properly positioned on the plunger. In an embodiment the retainer includes slots for receiving the tape.

In an embodiment, movement of the plunger in a first direction rotates the take up spool and movement of the plunger in a second, opposite direction does not rotate the take-up spool. The plunger can be mounted for reciprocating movement, such that reciprocating movement of the plunger in the first direction rotates the take-up spool to take up the cleaning material on the take-up spool and wherein reciprocating movement of the plunger in the second, opposite position feeds cleaning material from the feed spool. In an embodiment, reciprocating movement of the plunger in the first direction is against the spring and to a retracted position which rotates the take-up spool to take up the cleaning material on the take-up spool and reciprocating movement of the plunger in the opposite direction is to the extended position, which feeds cleaning material from the feed spool.

The central support assembly can include a track formed therein. In such an embodiment, the tape traverses from the feed spool through the central support assembly track, over an end of the plunger, through the central support assembly track and to the take-up spool.

The device drive can include a drive plate operably connected to the take-up spool. The drive plate has a drive gear and a linear gear is operably mounted to the plunger. The linear gear and drive plate gear mesh with one another to rotate the take-up spool in one direction with movement of the plunger. A biasing element, such as a spring biases the plunger to the extended position.

The drive can include a one-way drive ratcheting system to effect the one-way rotation of the take-up spool. The one-way ratcheting system can include one or more teeth on the take-up spool or the drive plate that cooperate with one or more pawls on the other of the take-up spool and the drive plate. In an embodiment, the teeth are located on the take-up spool and the pawls are located on the drive plate. In such an arrangement, rotation of the drive plate in one direction engages the teeth with the pawls to when the take-up spool rotations in the opposite direction the teeth do not engage the pawls.

The device can also include an anti-unspooling system to prevent the tensioned tape from unspooling from the take-up spool. The anti-unspooling system can include one or more fingers on the take-up spool or the body and one or more detents on the other of the take-up spool and the body. The fingers cooperate with the detents to prevent reverse rotation and unspooling of the tape from the take-up spool. In an embodiment, the fingers are located on the take up spool and the detents are located on the body.

A reservoir assembly can be mountable to the body such that the central support assembly is positioned, in part, in the reservoir assembly. The reservoir assembly is mountable to the body for reciprocation relative to the body and to the central support assembly. In such a configuration, the end of the plunger is extendable from an end of the reservoir assembly. One or more valve assemblies can be positioned at an end of the reservoir assembly such that the end of the plunger passes through the valve assemblies when the plunger is extended from the end of the reservoir assembly. A wicking assembly can be mounted at about an end of the reservoir assembly, between the two valve assemblies.

A biasing element, such as a spring, can be operably connected to the reservoir assembly to bias the reservoir assembly to an extended position relative to the body. An annulus region can be formed in the reservoir and a cleaning solution can be present in the annulus region.

BRIEF DESCRIPTION OF THE DRAWINGS

The benefits and advantages of the present disclosure will become more readily apparent to those of ordinary skill in the relevant art after reviewing the following detailed description and accompanying drawings and photographs, wherein.

DETAILED DESCRIPTION

Figure 1:
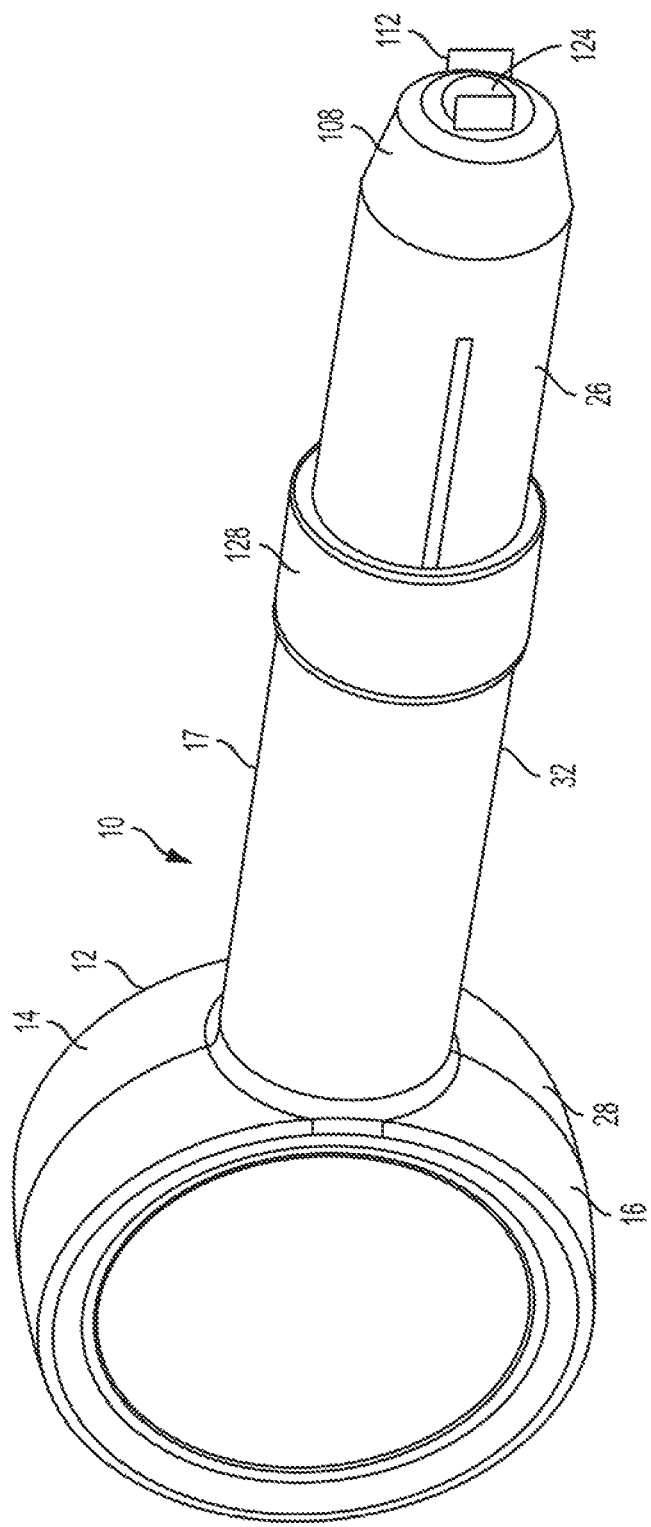
FIG. 1 is a perspective view of an embodiment of a portable, self-contained fiber optic cleaning tool.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment, size or shape illustrated.

Figure 2:
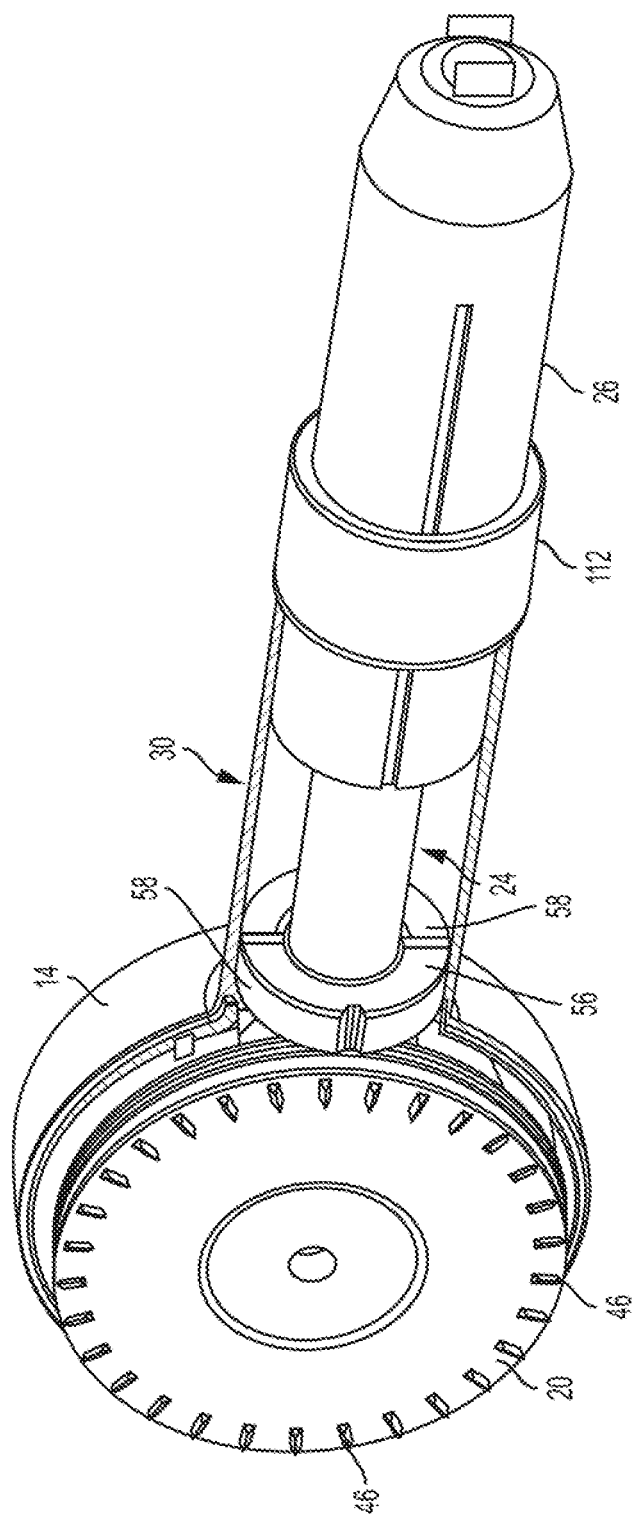
FIG. 2 is perspective view of the tool with the take-up spool shell removed for clarity of illustration.

Referring now to the figures and in particular to FIGS. 1 and 2, there is shown a portable, self-contained fiber optic cleaning tool 10. The tool 10 includes generally, a body 12 having first and second shells, 14, 16 a feed spool 18, a take-up spool 20, a reciprocating plunger 22, a central support assembly 24 and a removable reservoir assembly 26. The first and second shells 14, 16 define an enclosure 17. In an embodiment, the shells 14, 16 define a circular main body 28 and a portion 30 (about one-half) of a cylinder extending from and integral with the main body 28. When the shells 14, 16 are fitted together, they form the enclosure 17, which in an embodiment defines a cylinder 32 extending from the main body 28. The shells 14, 16 can be formed with stand-offs 15, 17 to reduce friction of the rotating components and to improve moldability. Those skilled in the art will appreciate that the body 28 and enclosure 17 can take various shapes, which shapes are within the scope and spirit of the present disclosure.

Figure 3:
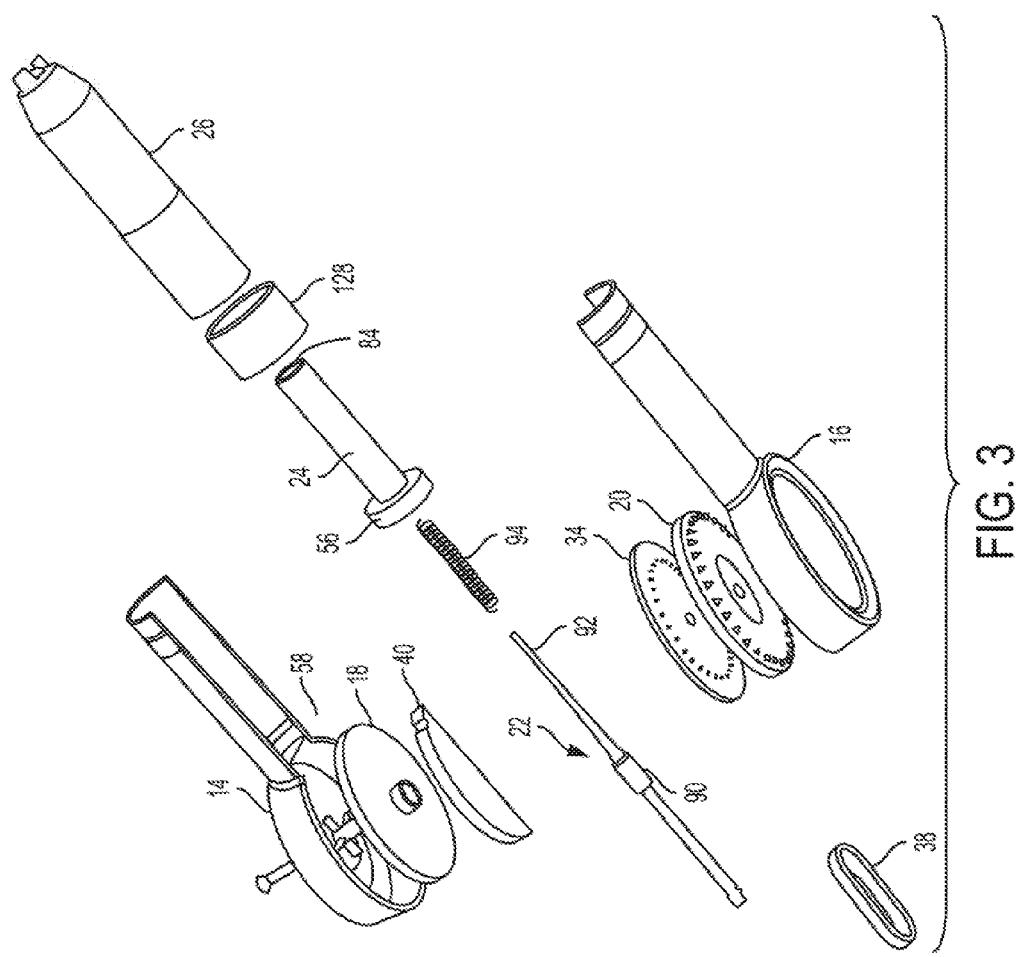
FIG. 3 is a partially exploded view of the tool.
Figure 4:
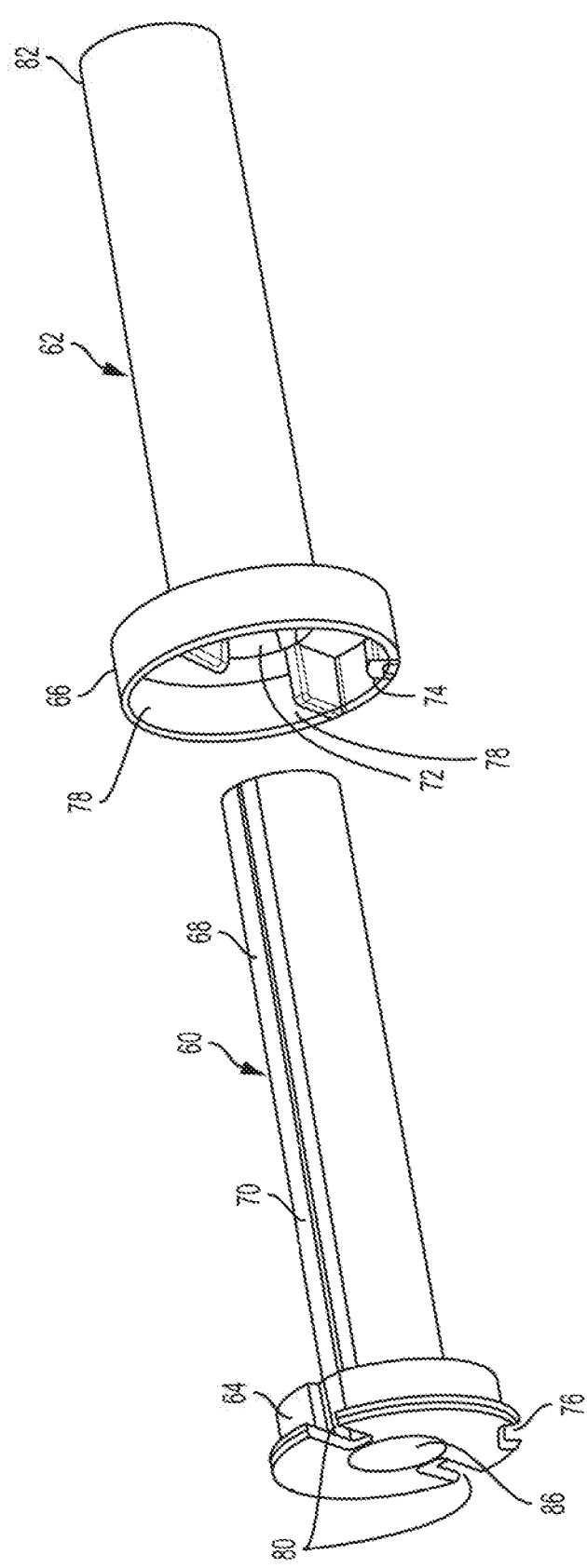
FIG. 4 is a perspective view of the central support assembly shown exploded for illustrative purposes.
Figure 5:
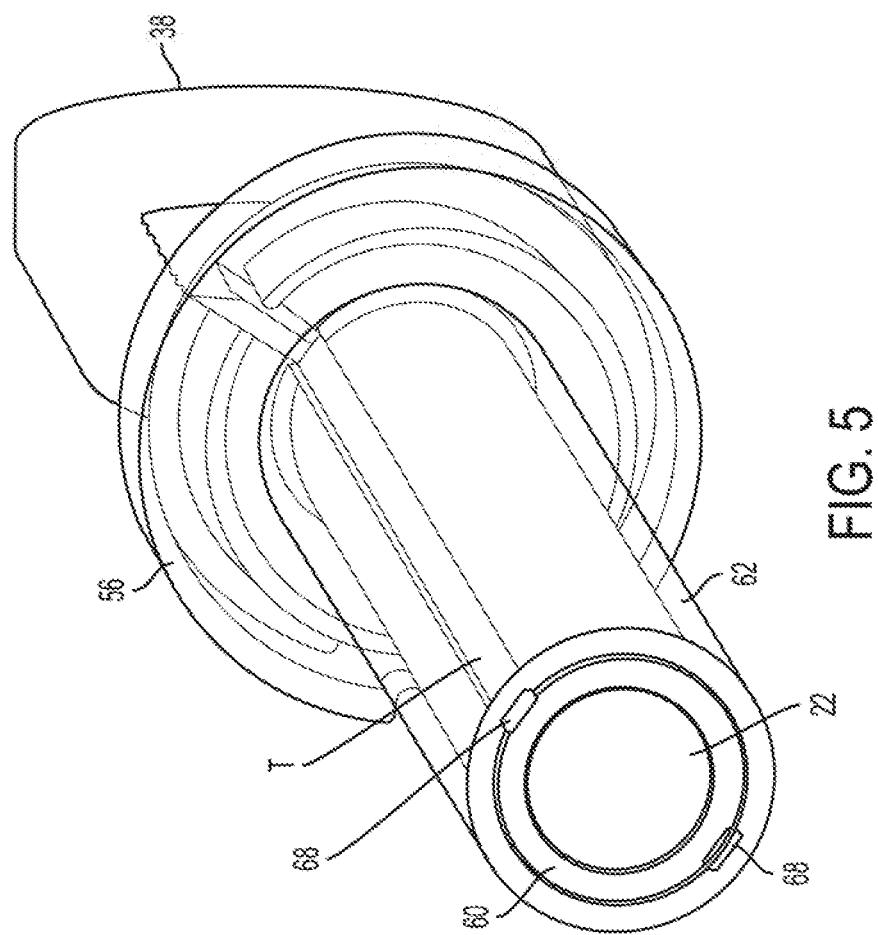
FIG. 5 is a front view of the central support assembly showing a tape positioned in the track.
Figure 6:
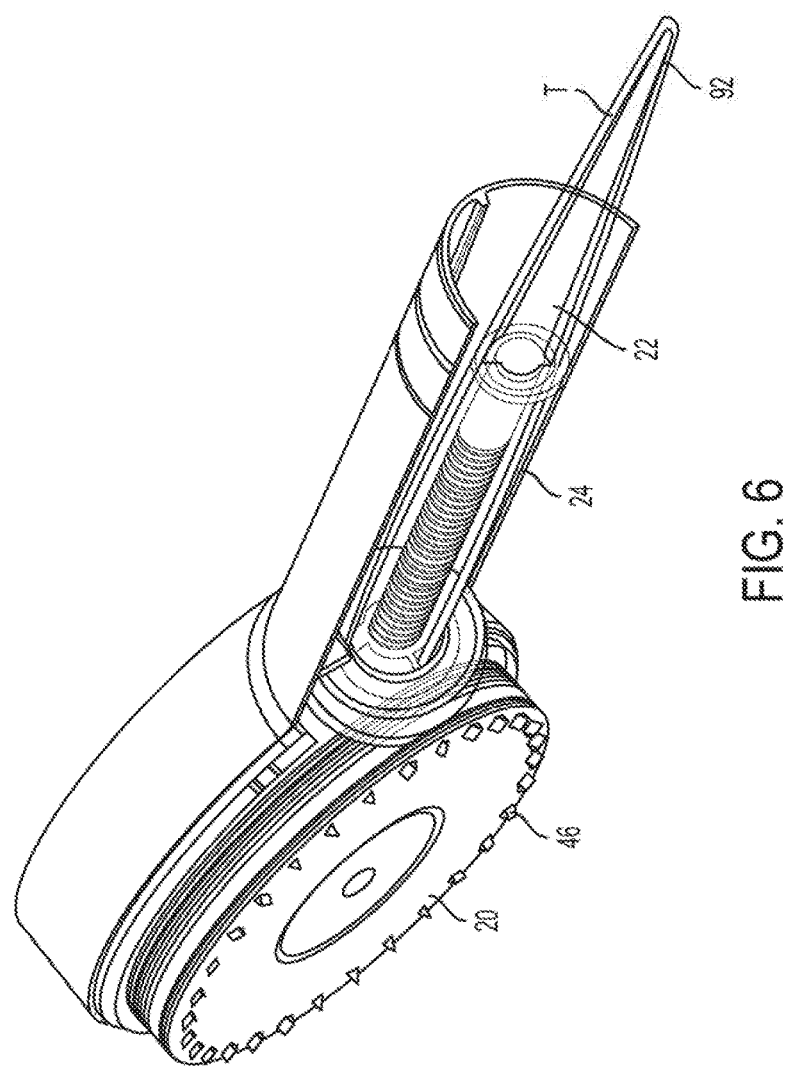
FIG. 6 is a perspective view of the take-up spool and shell, and the central support assembly showing the tape positioned over the tip of the plunger cleaning finger.

Referring to FIG. 3, the feed and take-up spools 18, 20 feed out and take-up the tape T as it is advanced through the tool 10. In an embodiment, the spools 18, 20 and plunger 22 are operably connected to one another. The plunger 22 extends through the body 12 and the central support assembly 24, from a gear plate 34 to and into (and in use, through), the removable reservoir assembly 26.

In an embodiment, the spools 18, 20 are operably connected to one another and to the gear plate 34. The gear plate 34 includes a drive gear 36 that meshes with a rack 38 gear on the end of the plunger 22. A rack follower 40 is positioned in one of the shells 14, 16 and engages the rack gear 38 to maintain the rack gear 38 engaged with the drive gear 36 and to prevent the rack gear 38 from jumping off of the drive gear 36.

Figure 16:
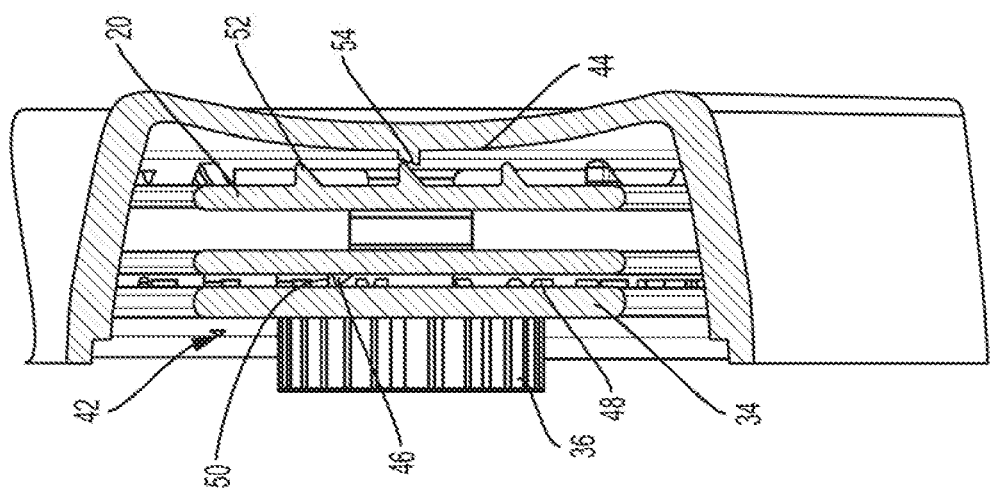
FIG. 16 is a partial cross-sectional view of the take-up spool showing the dual-ratcheting system.

Referring briefly to FIG. 16, the take-up spool 20 includes dual ratcheting systems 42, 44 that permit only one-way drive of the spool 20 and that prevent roll-back or unspooling of the tape material T from the take-up spool 20. The one-way drive ratcheting system 42 includes one or more angled teeth 46 that extend from one reel of the spool 20. The teeth 46 are engaged by pawls 48 on the gear plate 34. When the gear plate 34 is driven in a drive direction, the pawls 48 engage a flat side 50 of the teeth 46 which drives or rotates the spool 20. When the gear plate 34 is driven in an opposite direction, the pawls 48 move over the teeth 46 and the spool 20 is prevented from rotating.

The anti-unspooling system 44 is provided by a set of angled or sloped fingers 52 on the spool 20. In an embodiment, the fingers 52 are positioned about a peripheral edge of the spool 20 that engage one or more detents 54 on the spool shell 16. As best seen in FIG. 16, as the spool 20 is rotated downward by rotation of the gear plate 34, the pawls 48 on the gear plate 34 engage the teeth 46 on the spool 20 and drive the spool 20 downward which in turn drives take-up of the tape T. Because there is tension on the tape T (as is discussed in more detail below), the spool 20 will tend to rotate upward to relieve the tension and unspool the tape T. Engagement of the fingers 52 and detents 54 prevents the unspooling and maintains the tape T in tension.

Referring again to FIG. 3, the plunger 22 is positioned in the central support assembly 24. The central support assembly 24 includes a ring 56 at a rear end thereof that is positioned between a pair of flanges 58 in the shells 14, 16. The flanges 58 maintain the central support assembly 24 in place in the tool 10.

As illustrated in FIGS. 4-7, in an embodiment, the central support assembly 24 is an elongated, two-piece assembly having an inner support tube 60 and an outer support tube 62 and with the ring 56 at the rear end of the assembly 24. The ring 56 can be formed from rings 64, 66 at the rear ends of the inner and outer support tubes 60, 62 that fit into one another. A track 68 is formed extending longitudinally along axially opposed outer sides 70 of the inner support tube 60. As such, the track 68 is defined, in part, by the inner wall 72 of the outer tube 62. The track 68 is configured to receive and to provide a guide for the tape T as it is advanced in the tool 10. An indexing finger 74 in the outer support tube ring 66 engages a recess 76 in the inner support tube ring 64 to maintain the inner and outer support tubes 60, 62 properly aligned with one another and to maintain the central support assembly 24 aligned in the tool 10. Inwardly oriented walls 78 extend from an inner surface of the outer support tube ring 66 into cut-outs 80 in the inner support tube ring 64 to define the entrance to and exit from track 68. The forward end 82 of the outer support tube 62 includes an inwardly oriented lip 84. A central bore 86 extends through the inner support tube 60 and through an opening 88 defined by the inwardly oriented lip 84.

Figure 7:
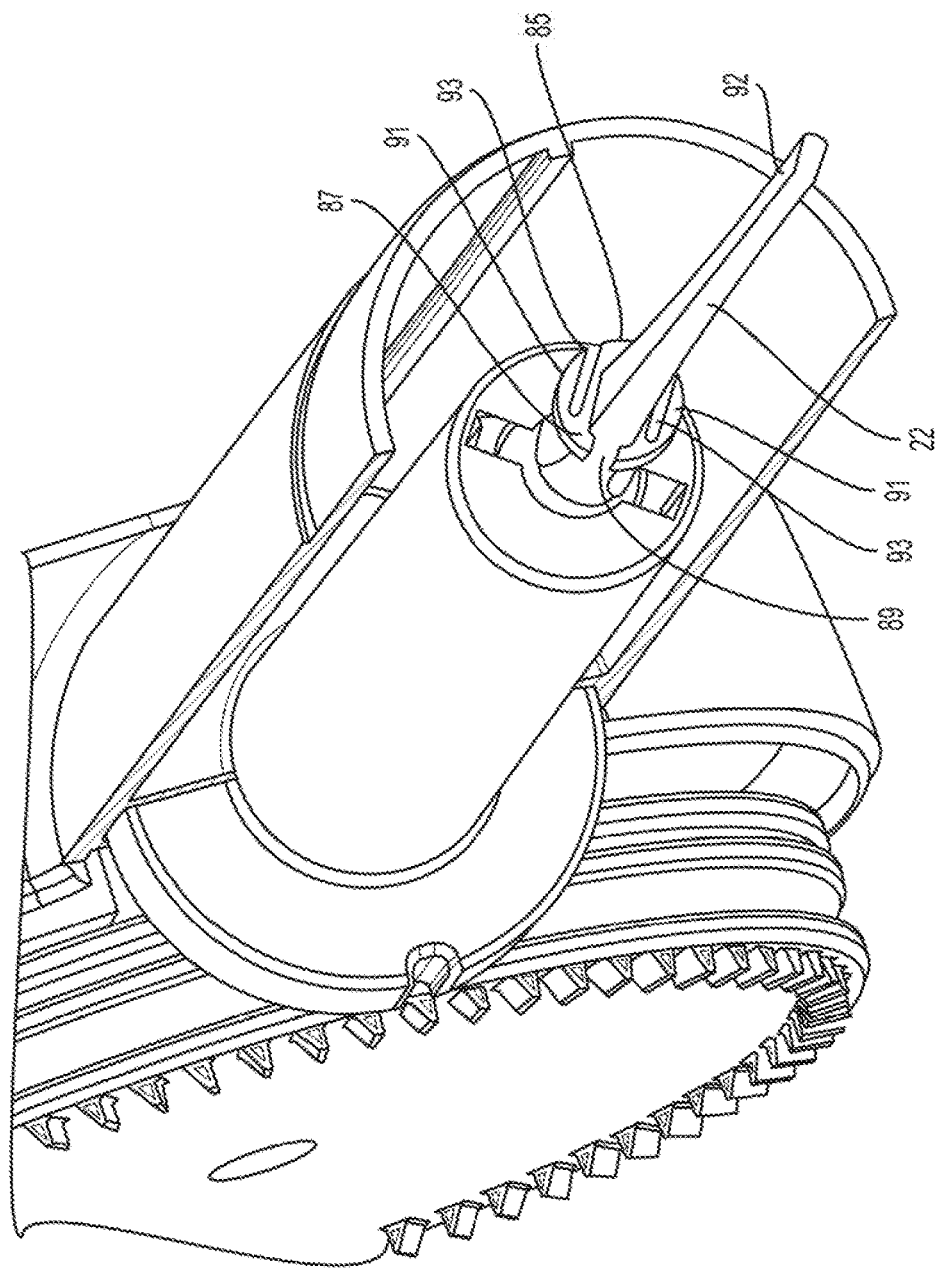
FIG. 7 is a perspective view similar to FIG. 6 illustrating a tape support for supporting the tape as it traverses over the plunger cleaning finger.
Figure 8:
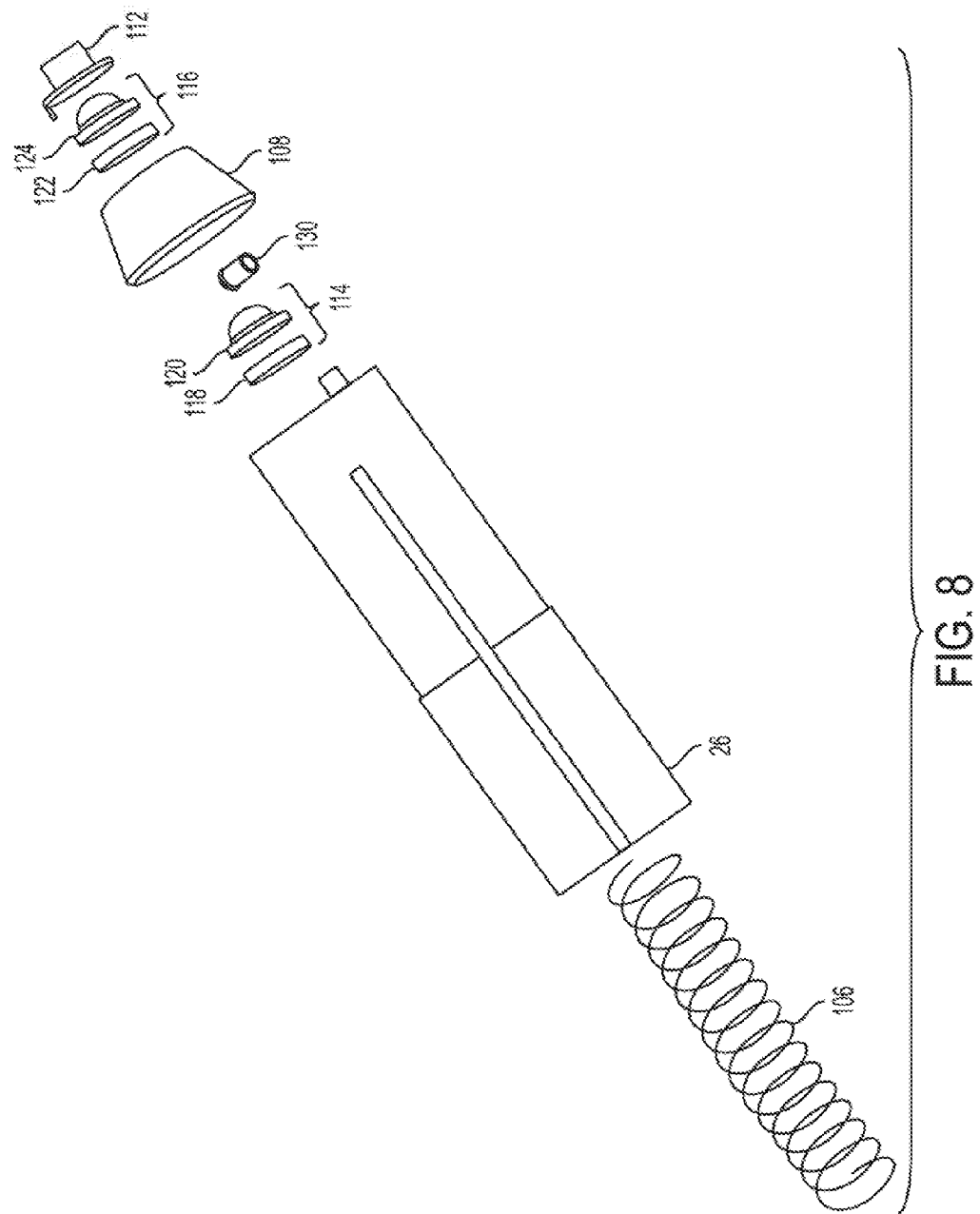
FIG. 8 is an exploded view of the reservoir assembly.
Figure 9:
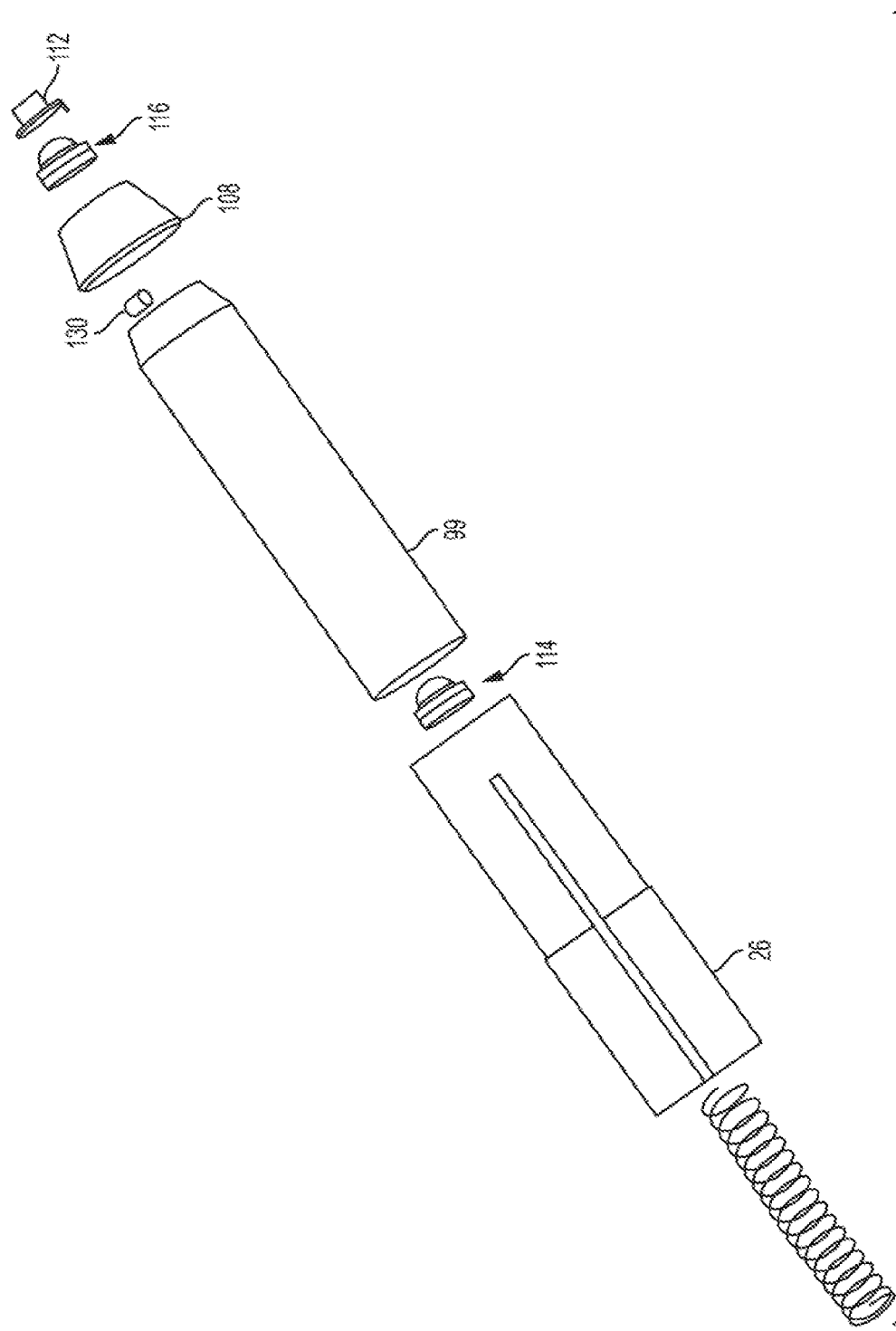
FIG. 9 is another exploded view of the reservoir assembly showing the porous insert for storing a solution.
Figure 10:
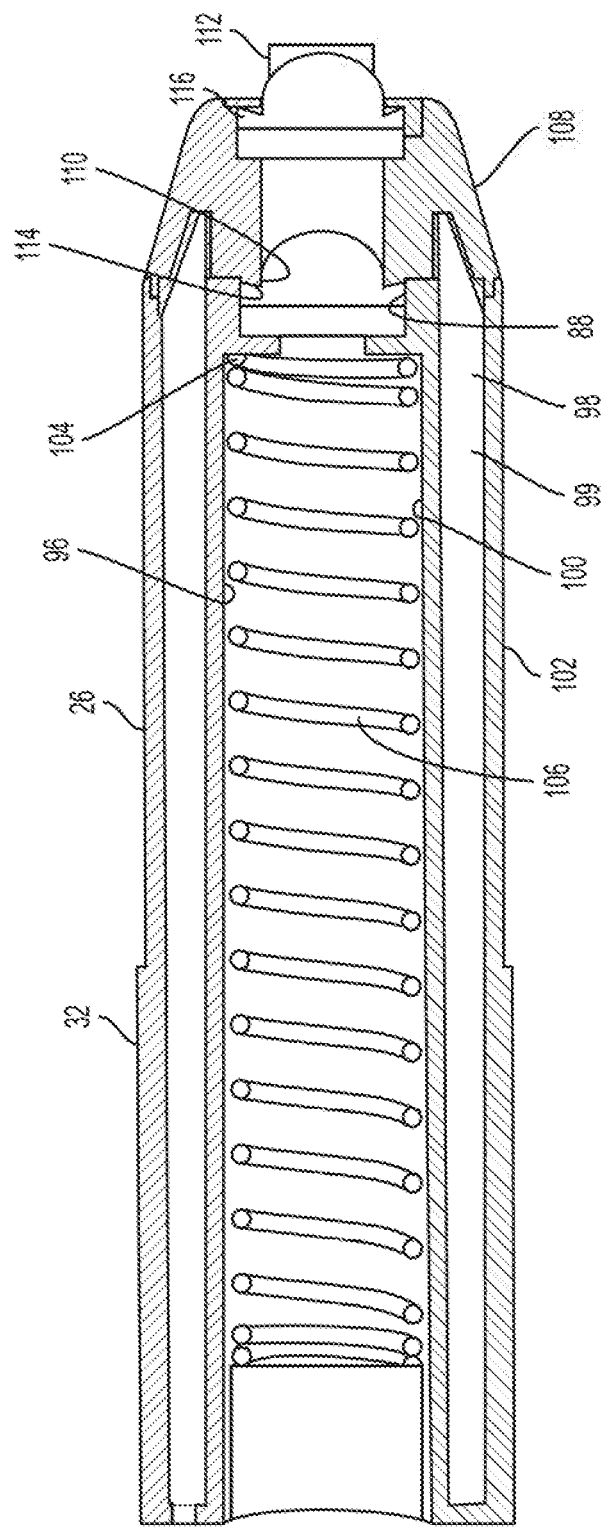
FIG. 10 is an enlarged partial cross-sectional view of the reservoir assembly and cap showing the valve seals in place.
Figure 11:
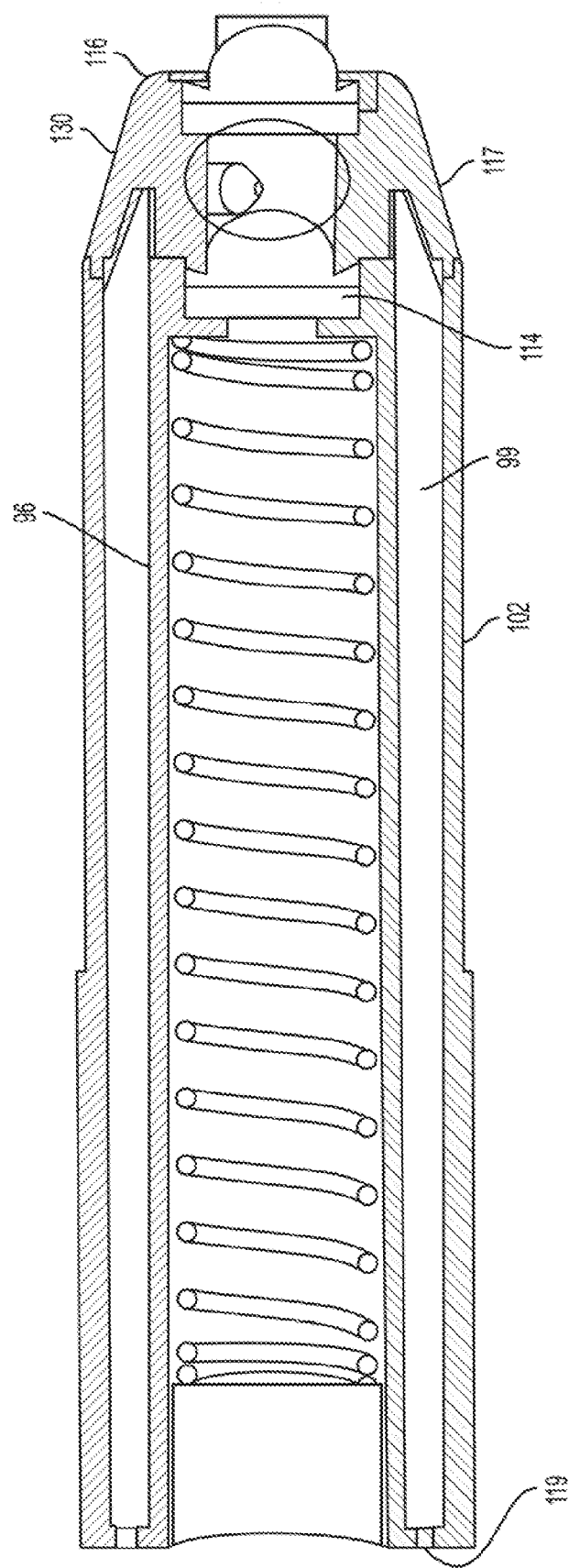
FIG. 11 is another cross-sectional view of the reservoir assembly and cap showing the valve seals, the wicking finger and the porous plastic insert in place.
Figure 12:
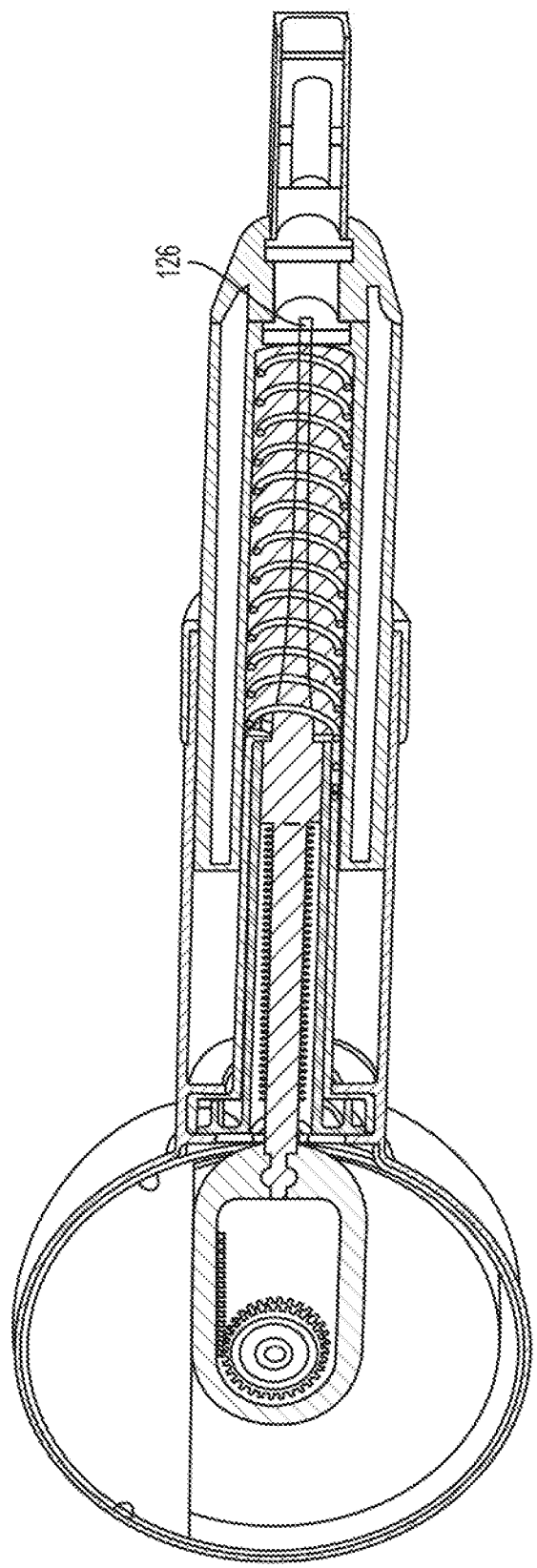
FIG. 12 is a cross-section view of the tool with the plunger in a pre-use state.
Figure 13:
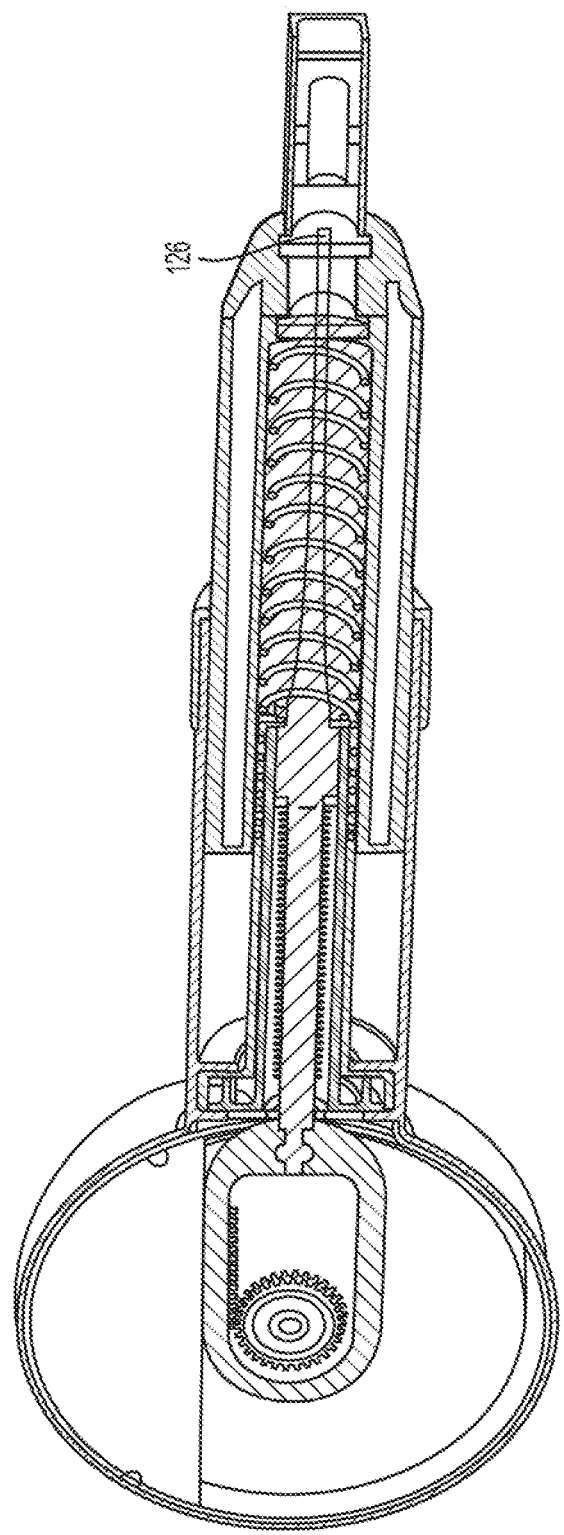
FIG. 13 is a cross-sectional view of the tool with the reservoir moved rearward, toward a use state, showing the cleaning finger extending through the inner valve seals and penetrating the outer valve seals.
Figure 14:
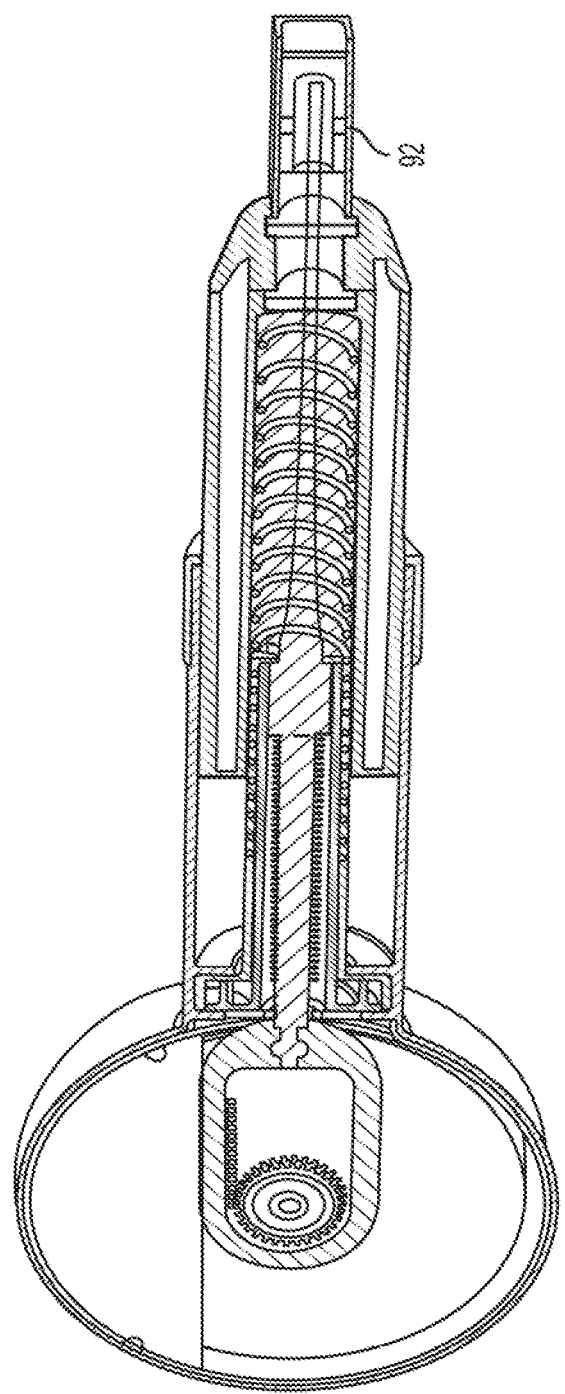
FIG. 14 is a cross-sectional view of the tool with the plunger fully extended for cleaning and in contact with a fiber optic surface to be cleaned.
Figure 15:
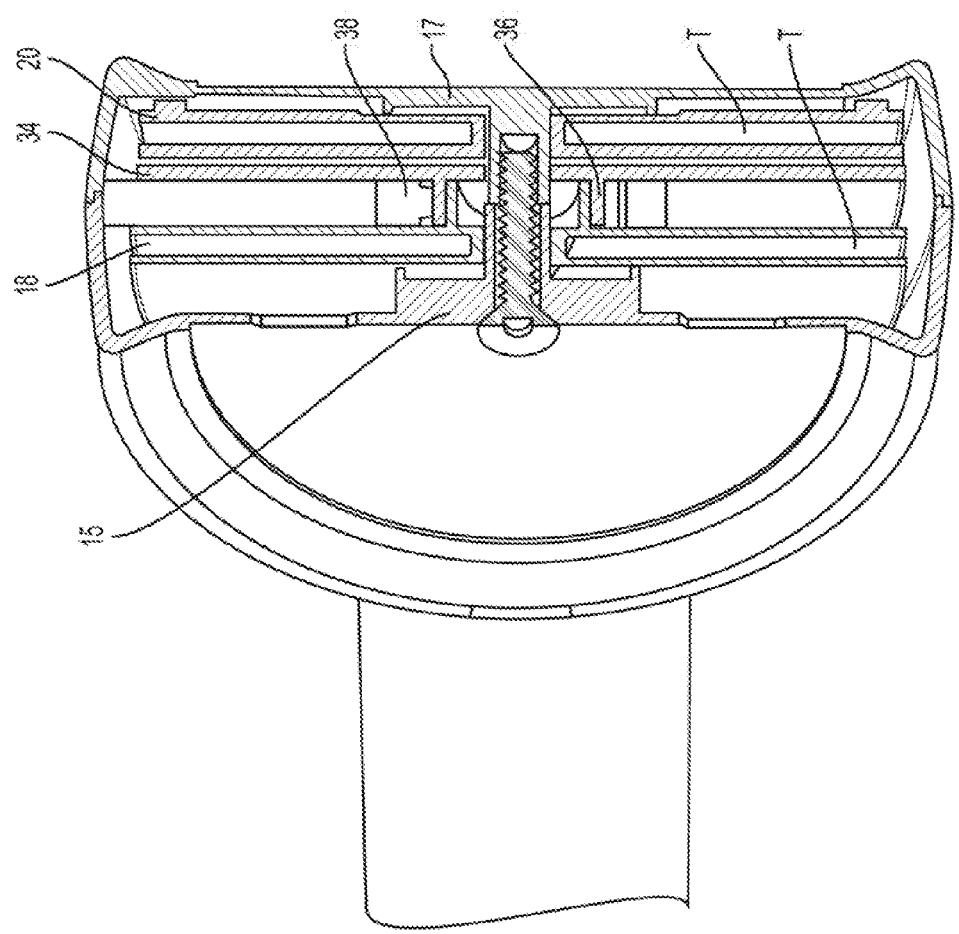
FIG. 15 cross-sectional view of the feed and take-up spools and the gearing for driving the take-up spool.

Referring to FIG. 7, a tape retainer 85 can be positioned on the plunger 22. The retainer 85 is configured to retain and support the tape T as it traverses along and over the plunger 22. In an embodiment, the retainer 85 has a disk-like shape with a central opening 87 through which the plunger 22 is inserted. The central opening 87 can include a channel 89 that permits the retainer 85 to spread as it is fitted over the plunger 22 to snugly fit the retainer 85 onto the plunger 22. The retainer 85 can include a pair of arms 91 defined by slots 93 on either side of the central opening 87 in which the tape T is inserted. In this manner, the arms 91 maintain the tape T in the retainer 85 on the plunger 22.

The plunger 22 is positioned in and extends through the inner support tube bore 86. As noted above, the plunger 22 includes a rack gear 38. The rack gear 38 may be formed as a separate member mounted to a rear end of the plunger 22 or can be formed integral with the plunger 22. A stop 90 is positioned about centrally on the plunger 22 and a cleaning finger 92 is formed at a forward end of the plunger 22. The stop 90 is configured to reciprocate within the bore 86 and engages the inwardly oriented lip 84 to prevent over-extension of the plunger 22. The cleaning finger 92 can include a guide (not shown) on an end thereof. The guide captures and guides the tape T as it traverses over the end of the finger 92.

A biasing element 94, such as the illustrated coil spring is positioned around the plunger 22, between the plunger 22 and support assembly inner bore 86 and between the stop 90 and the inner support assembly ring 64. The spring 94 biases the plunger 22 to the extended position.

Referring to FIGS. 8-14, the reservoir assembly 26 is mounted to an end of and partially within the cylinder 32 so as to reciprocate, in part, within the cylinder 32. The reservoir assembly 26 includes a central bore 96 and an annulus 98 formed between inner and outer walls 100, 102 of the reservoir assembly 26. The inner bore 96 of the reservoir 26 fits over the outer support tube 62 and within the body cylinder 32 so as to reciprocate relative to, and be captured between, the support assembly 24 and body cylinder 32. The annulus 98 is configured to store a quantity of cleaning fluid. In an embodiment, the reservoir assembly 26 includes a formed porous plastic element 99 therein that releases and feeds the cleaning solution to a wicking finger 130, which is discussed in more detail below. Materials that can be used for the porous plastic element 99 include, for example, synthetic foams, synthetic and natural felt, synthetic and natural sponges, and the like. These materials facilitate metered feed of cleaning solution to the cleaning media T. Other types and configurations of materials for use in the porous plastic element 99 will be recognized by those skilled in the art.

The wall 100 that defines the reservoir assembly bore 96 includes an inwardly projecting lip 104. A biasing element 106, such as a spring is positioned within the bore 96 with an end of the spring 106 resting against the inwardly projecting lip 104 and an opposite end of the spring 106 resting on or engaging the central support assembly 24. The spring 106 biases the reservoir assembly 26 to the extended position.

A cap 108 is fitted to a forward end of the reservoir assembly 26. The cap 108 has an inwardly projecting lip 110 that extends inward, toward the reservoir bore 96. A connector adapter 112 is mounted to the end of the cap 108. The connector adapter 112 is configured to allow use of the tool 10 with a multitude of fiber optic connector types.

Two sets of valves 114, 116 are present at about the end of the tool 10. In an embodiment, a first or inner set of valves 114 includes a flat seal valve 118 and a rounded or domed seal valve 120. The inner set of valves 114 is positioned at the end of the reservoir bore 96, and is secured at the end between the cap 108 and the inwardly projecting lip 104 at the end of the reservoir bore 96. The second or outer set of valves 116 can also include a flat seal valve 122 and a rounded or domed seal valve 124. The outer set of valves 116 is positioned between an end of the cap 108 and the connector adapter 112. Both the inner and outer sets of valves 114, 116 have slitted openings as at 126, to allow the cleaning finger 92 to move through the slits 126 in the seals 114, 116 to contact the fiber optic surface to be cleaned. Other types and configurations of valves 114, 116 for use in the present tool 10 will be recognized by those skilled in the art. The space 117 between the valves 114, 116 is sealed from the environs when the tool 10 is not in use (when the plunger 22 is retracted) to reduce or prevent evaporation of the cleaning solution. An opening 119 can be formed at an end of the reservoir assembly 26 permits refilling the assembly 26 with cleaning solution as desired.

The reservoir assembly 26 can be mounted to the tool 10 and secure to the tool 10 by, for example, a locking ring 128. The locking ring 128 can be fitted about the end of the body cylinder 32 and over the body cylinder 32 and the portion of the reservoir assembly 26 that fits into the cylinder 32. The ring 128 can include a locking arrangement, such as a threaded mount, a bayonet mount, a friction fit or the like. The removable reservoir assembly 26 provides a number of advantages. First, it allows for replacement of either the tape-containing portion of the tool 10, or the solution containing portion of the tool 10, without replacement of the other. In addition, it provides for wetting the tape T outside of the tool 10 boundary to reduce the potential for in-leakage of the cleaning solution to the tool mechanical elements and the clean tape T stored on the feed spool 18 during storage, use and transport. This also provides the opportunity to match the cleaning solution to the soil type for optimum soil removal, and to match the tape media T to the soil for optimum cleaning ability. Other types of cleaning solutions, solvents and aqueous mixtures for use in the present tool 10 will be recognized by those skilled in the art.

A wicking finger 130 is positioned in the cap 108, between the inner and outer sets of valves 114, 116. The wicking finger 130 is configured to apply cleaning solution to the tape T. The solution will wick from the point at which it is applied to the tape T, to the tape T at the end of the finger, thus wetting the tape at the finger (where the tape contacts the component to be cleaned). The wicking finger 130 is sized (for example, diameter and volume), and the material is selected, so that the solution will not wick much, if at all beyond the end of the finger 92 and back toward the tape feed. That is, the wicking finger 130 can be configured to apply a desired amount of solution to the tape T. The wicking action and tape T movement will be described in more detail below. Although the above discussion describes a scenario in which the solution is applied to the tape T after the tape T has passed over the end of the finger 92, it is anticipated that the tool 10 can be configured such that the solution is applied to the tape T prior to passing over the end of the finger 92.

The materials of the tool 10 are selected to withstand use in the field, while at the same time maintaining the overall cost of the tool feasible. The materials for the fluid contacting surfaces are also selected so as to be compatible with the cleaning solution that may be stored in the reservoir. The tape T material is selected so as to provide a strong, yet flexible cleaning media that maintains its stability when used wet or dry. For example, the shells 14, 16 and locking ring 128 can be formed from, for example, acrylonitrile butadiene styrene (ABS), the gear plate 34 and central support assembly 24 can be formed from, for example, a nylon, such as nylon 66 that may be infused with glass fiber for additional strength.

The wetted parts, such as the reservoir assembly 26, the plunger 22, the connector adapter 112 and the cap 108 can be formed from materials that are compatible with the cleaning solution such as polyethylene terephthalate (PET), polybutylene terephthalate (PBT), nylon or the like that can be infused with glass fiber to increase strength. The valves seals 114, 116 can be formed from a variety of elastomeric materials (thermoplastic elastomers or TPEs) that provide the desired sealing characteristics as well as chemical compatibility. The tape T material is also selected for compatibility with the cleaning solution and can be, for example, natural, synthetic or blended fibers, woven or non-woven materials such as polyester, microfiber, cellulose, ultrasuede and the like. The tape T can also be formed as a laminate that includes a polymeric substrate to increase wet strength and durability when cleaning and advancing through the tool 10, wet or dry. The substrate may also be formed from a strong, yet low friction material to reduce the friction of the tape T as it traverses through the tool and over the cleaning finger 92. Other suitable materials for the tool 10 and tape T will be recognized by those skilled in the art.

As seen in FIGS. 6 and 12-14, in preparation for use, the tape T is wound about the feed and take-up spools 18, 20 in opposite directions so that as the spools 18, 20 are rotated (the spools rotate in the same direction), tape T is fed from the feed spool 18 and is taken up on the take-up spool 20. The tape T traverses from the feed spool 18 into the track 68 in the central support assembly 24. The tape T is maintained in place at the entrance by the inwardly oriented walls 78 of the outer support tube ring 66 and traverses along the track 68. As the tape T exits the forward end of the track 68, it traverses over and around the tip of the cleaning finger 92, and back into and through the track 68 to the take-up spool 20. The tape T is maintained in tension through the track 68 and around the finger 92 by the plunger spring 94 which biases the plunger 22 to the extended position, and by the unspooling fingers 52 and detents 54 on the take-up spool 20 and drive plate 34 that engage one another to prevent unspooling of the tape T from the take-up spool 20.

In use, the connector adapter 112 is placed against the component to be cleaned. The tool 10 is urged against the component, which pushes against the reservoir assembly 26. The cleaning finger portion 92 extends through and out of the first and second valve seals 114, 116 to contact the component. As the finger 92 extends through the valves seals 114, 116, the tape T on the finger is wetted as the return portion of the tape T (the tape T that has already passed over the end of the cleaning finger 92) comes into contact with the wicking finger 130. As discussed above, as the return tape T has passed beyond the end of the cleaning finger 92 and over the wicking finger 130, cleaning solution is transported from the wicking finger 130 onto the return tape T. The cleaning solution wicks into the tape T up to about the end of the cleaning finger 92 such that the tape T at the end of the finger 92 is wetted with solution. The wetted tape T is then used to clean the component. At this point in time, the tape T has not moved; that is, the tape T has not been fed from the feed spool 18 nor taken up on the take-up spool 20. Again, as noted above, the wicking finger 130 is sized so that cleaning solution wicks on to the tape T up to but not much beyond (if at all) the end of the cleaning finger 92, toward the clean tape T section.

At an appropriate time, for example, after the component has been cleaned with the wetted tape T, the cleaning finger 92 is further pressed or urged against the component which urges the plunger 22 rearward (toward the spools 18, 20). This in turn engages the rack gear 38 with the drive gear 36 and advances the tape T from the feed spool 18 to the take-up spool 20 to advance a clean and dry section of tape T. This clean and dry section of tape T comes to rest on the end of the cleaning finger and is used to dry the component. As noted previously, although the above discussion describes a scenario in which the solution is applied to the tape T after the tape T has passed over the end of the finger 92, it is anticipated that the tool 10 may be configured such that the solution is applied to the tape T prior to passing over the end of the finger 92.

Upon disengaging the tool 10 from the component, the reservoir assembly 26 returns to the extended position and the plunger 22 returns to the extended position by action of the springs 94, 106. In releasing the reservoir assembly 26 and plunger 22, the cleaning finger 92 retracts through the valve seals 114, 116 and into the reservoir assembly 26. Although the rack gear 38 travels with the plunger 22 and engages the drive gear 36, the take-up spool 20 remains stationary and does not move by virtue of the passing of the teeth 46 over the pawls 48 on gear plate 34 and take-up spool 20, respectively, which allows the rack gear 38 to move without rotating the take-up spool 20. Engagement of the fingers 52 and detents 54 on the take-up spool 20 and shell 16, respectively, prevent roll-back or unspooling of the tape T from the take-up spool 20. As such, in that the take-up spool 20 does not rotate, as the plunger 22 returns to the extended position, fresh or clean tape T is fed (or pulled) from the feed spool 18 into the track 68.

Those skilled in the art will appreciate the numerous advantages provided by the present self-contained cleaning tool 10. First, the tool and reservoir are separate components so that the tape-containing section of the tool 10 can be replaced separate and apart from the reservoir. In addition, the tool 10 is compact and self-contained allowing it to be used in the field and on components with limited access. Moreover, the design of the tool allows for wet-to-dry cleaning, in a two-stage process with essentially a single action of urging the tool 10 into engagement with the component to be cleaned. And, because the wicking finger 130 can be sized to control the amount of cleaning solution applied to the tape T, the problem of over-wetting the component and surfaces to be cleaned can be readily addressed and the amount of solution applied can be readily controlled.

It will also be appreciated by those skilled in the art that the tool 10 can be used with a cleaning media or tape that can polish a damaged, or fouled, end face. That is, the tool 10 can be used as a platform for other types of cleaning applications using different media, solutions, and some differences in form factors.

All patents referred to herein, are hereby incorporated herein by reference, whether or not specifically done so within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present disclosure. It is to be understood that no limitation with respect to the specific embodiments illustrated is intended or should be inferred. The disclosure is intended to cover by the appended claims all such modifications as fall within the scope of the claims.

What is claimed is:

1. A fiber optic component cleaning device comprising:
   a body;
   a feed spool mounted for rotation in the body;
   a take-up spool mounted for one-way rotation in the body;
   a central support assembly;
   a plunger, the plunger mounted for movement in the central support assembly;
   a drive operably connected to the take-up spool and to the plunger;
   a cleaning material wound onto the feed and take-up spools, the cleaning material being fed from the feed spool to the take-up spool; and
   a reservoir assembly mountable to the body, wherein the central support assembly is positioned, in part, in the reservoir assembly, and wherein an end of the plunger is extendable from an end of the reservoir assembly, the reservoir assembly mountable to the body for reciprocation relative to the body and to the central support assembly.

2. The device of claim 1 wherein the plunger is mounted for reciprocating movement in the central support assembly.

3. The device of claim 1 wherein movement of the plunger in a first direction rotates the take up spool and movement of the plunger in a second, opposite direction does not rotate the take-up spool.

4. The device of claim 3 wherein the plunger is mounted for reciprocating movement, and wherein reciprocating movement of the plunger in the first direction rotates the take-up spool to take up the cleaning material on the take-up spool and wherein reciprocating movement of the plunger in the second, opposite position feeds cleaning material from the feed spool.

5. The device of claim 1 wherein the central support assembly has a track formed therein and wherein the tape traverses from the feed spool through the central support assembly track, over an end of the plunger, through the central support assembly track and to the take-up spool.

6. The device of claim 1 wherein the drive includes a drive plate operably connected to the take-up spool, the drive plate having a gear thereon, the plunger having a linear gear operably mounted thereto, the linear gear and drive plate gear meshed with one another to rotate the take-up spool in one direction with movement of the plunger.

7. The device of claim 1 including a biasing element to bias the plunger to an extended position.

8. The device of claim 6 including a one-way drive ratcheting system having one or more teeth on one of the take-up spool and the drive plate cooperating with one or more pawls on the other of the take-up spool and the drive plate, wherein rotation of the drive plate in one direction engages the one or more teeth with the one or more pawls to rotate the take-up spool and wherein rotation of the drive plate in an opposite direction does not engage the one or more teeth with the one or more pawls.

9. The device of claim 8 wherein the one or more teeth are located on the take-up spool and the one or more pawls are located on the drive plate.

10. The device of claim 1 including an anti-unspooling system including one or more fingers on one of the take-up spool and the body and one or more detents on the other of the take-up spool and the body, wherein the one or more fingers cooperate with the one or more detents to prevent unspooling of the cleaning material from the take-up spool.

11. The device of claim 10 wherein the one or more fingers are located on the take up spool and the one or more detents are located on the body.

12. The device of claim 1 including a valve assembly positioned at an end of the reservoir assembly, and wherein the end of the plunger passes through the valve assembly when the plunger is extended from the end of the reservoir assembly.

13. The device of claim 12 including two valve assemblies and wherein the end of the plunger passes through the two valve assemblies when the plunger is extended from the end of the reservoir assembly.

14. The device of claim 1 including a wicking assembly mounted at about an end of the reservoir assembly.

15. The device of claim 1 including a biasing element operably connected to the reservoir assembly to bias the reservoir assembly to an extended position relative to the body.

16. The device of claim 1 including an annulus region in the reservoir, and wherein a cleaning solution is present in the annulus region.

17. The device of claim 1 wherein the cleaning material is a tape.

18. The device of claim 14 wherein the wicking assembly is positioned so that the tape contacts the wicking assembly as the tape is conveyed beyond a tip of the cleaning finger, toward the take-up spool, the wicking assembly transferring a solution onto the cleaning material, the solution wicking into the cleaning material at a location at about the tip of the cleaning finger.

19. The device of claim 1 including a tape retainer, the tape retainer mounted to the plunger and including slots for receiving the tape.

* * * * *